United States Patent [19]

Weigand et al.

[11] Patent Number: 4,554,784

[45] Date of Patent: Nov. 26, 1985

[54] EMERGENCY POWER UNIT AND METHOD

[75] Inventors: Francis K. Weigand, Torrance; William H. Nickel, Rancho Palos Verdes, both of Calif.

[73] Assignee: The Garrett Corporation, Los Angeles, Calif.

[21] Appl. No.: 524,048

[22] Filed: Aug. 17, 1983

[51] Int. Cl.[4] .......................... F02C 3/20; F01N 3/15
[52] U.S. Cl. .............................. 60/39.02; 60/39.462; 60/723; 422/179
[58] Field of Search ............... 60/39.02, 39.462, 200.1, 60/723; 422/177, 179, 219, 221

[56] References Cited

U.S. PATENT DOCUMENTS

| | | | |
|---|---|---|---|
| 3,094,394 | 6/1963 | Innes et al. | 60/299 |
| 3,598,543 | 8/1971 | Crosby et al. | 60/299 |
| 3,838,977 | 10/1974 | Warren | 422/179 |
| 3,899,303 | 8/1975 | Gaysert | 422/177 |
| 4,069,664 | 1/1978 | Ellion et al. | 60/200.1 |
| 4,352,782 | 10/1982 | Daly | 60/299 |

FOREIGN PATENT DOCUMENTS

| | | | |
|---|---|---|---|
| 2300843 | 3/1973 | Fed. Rep. of Germany | 422/177 |
| 2188536 | 3/1974 | France | 422/179 |

Primary Examiner—Carlton R. Croyle
Assistant Examiner—Timothy S. Thorpe
Attorney, Agent, or Firm—James W. McFarland; Albert J. Miller

[57] ABSTRACT

An emergency power unit method and apparatus with means for inhibiting vibration of the catalyst bed while permitting spring loading thereof, and for automatically compensating for movement of the catalyst bed caused by the spring loading.

14 Claims, 3 Drawing Figures

EMERGENCY POWER UNIT AND METHOD

CROSS-REFERENCE TO RELATED APPLICATIONS

Similar subject matter to that disclosed herein is included in U.S. Ser. No. 524,047 of George Kasabian entitled "Gas Generator With Ratchet No Back and Method" and U.S. Ser. No. 524,049 of Ronald J. Ness entitled "No-Back Gas Generator and Method", both having a common filing date herewith and being commonly assigned.

BACKGROUND OF THE INVENTION

Gas generators, particularly those having application as emergency power units for military aircraft, are small, lightweight, intermittent duty power supply devices which ensure instant, reliable power output even after relatively long dormant periods. Such gas generators typically utilize a spray of liquid hydrazine into a catalyst bed such as Shell 405, in which production of hot gas occurs. The gas generated by the device may then be used to drive a turbine wheel, which may power such devices as engine starters, electrical generators, and hydraulic pumps.

Gas generators for military applications are designed to be reusable, with only a minimal amount of maintenance being required between uses. It is therefore imperative that the gas generator be capable of a consistent and reliable level of performance involving repeated usage over an extended period of time without requiring major overall, rebuilding, or replacement of the catalyst.

Liquid hydrazine is supplied to the gas generator at a pressure of approximately 100 p.s.i., and gas leaving the generator is at approximately the same pressure. The gas generator is therefore controlled by the amount of liquid hydrazine sprayed into the catalyst bed, which amount determines the volume of gas produced by the gas generator, and therefore controls the speed at which a turbine driven by the gas generator will operate.

In order to precisely control the operating speed of the turbine, liquid hydrazine is metered into the catalyst bed at a rate sufficient to provide the required output power. The speed of the turbine is controlled by varying the rate at which the liquid hydrazine flows into the gas generator, increasing the flow rate to increase the speed of the turbine, and decreasing the flow rate to decrease the speed of the turbine. It will be recognized that having precise control of the speed of the turbine, and the volume and other characteristics of the gas produced by the gas generator, is an important requirement.

The combustion process by which the hydrazine fuel is converted to warm gas has proven to be extremly destructive to the catalyst bed, drastically limiting the life of the gas generator. The hydrazine liquid which flows into the gas generator causes an oscillatory movement in the catalyst bed resulting in destructive vibration of the catalyst, which is in the form of particles having a particular size and shape. The vibration in the catalyst bed causes the particles to be broken down into less useful, smaller particles, and finally into dust. The vibration problem is particularly destructive immediately adjacent the spray nozzles through which the liquid hydrazine is introduced into the gas generator. As the catalyst particles in the bed break up, the dust produced migrates through the bed which becomes clogged rapidly by the dust, thus increasing the pressure drop across the gas generator. The vibration problem in the bed is so severe as to cause significant abrasion on the interior of the gas generator.

In order to minimize this problem, in the past biasing springs have been used to force the catalyst bed, typically enclosed in a porous cylindrical structure, against housing support structure to compensate for compacting, bed degradation and/or manufacturing tolerances, and to reduce the amount of vibration occurring therein due to the hydrazine spray after an initial use of the system. While this technique allows reuse of the gas generator without the necessity to completely rebuild the generator after each use, the number of uses the generator is capable of without requiring rebuilding and replacement of the catalyst is still far less than satisfactory. The initial degradation of the catalyst bed is somewhat slower when springs are used, but after initial wear in the catalyst bed occurs the catalyst degrades at a quickly increasing rate. It has been found that once flow-induced vibration is set up in the bed, the action of the spring in certain circumstances can further enhance bed vibration.

Another factor in the problem is the ambient temperature at which the gas generator is operating. While catalyst degradation is merely unsatisfactory at ambient temperatures of 70° F., at lower operating temperatures the catalyst breakdown rate drastically increases to make the expected life time of the gas generator particularly short, rendering the device no longer just unsatisfactory but rather unacceptable. While the number of multiple starts possible at a low ambient operating temperature is a maximum of 5-10, it must be noted that the performance of the gas generator as an engine start device sharply diminishes resulting in a markedly slower turbine acceleration, increasing start time, and drastic catalyst weight loss through increasing oscillatory vibration.

Since one of the most important applications of the gas generator is as an emergency power source for a military aircraft, which typically operates at a high altitudes having a low ambient temperature, it can be seen that this type of gas generator will have a fairly short operating life after which a complete rebuilding and replacement of the catalyst bed is necessary. Since the gas generator has application as a component in the emergency power system for the aircraft, any failure in the gas generator could result in loss of the aircraft due to failure to restart the engine or operate the electric or hydraulic system of the plane. Furthermore, an operational test of the gas generator cannot be performed conveniently because the hydrazine fuel must be stored in sealed tanks to prevent leakage. Testing of the gas generator would cause this seal to be ruptured, requiring that the tank be replaced. Also, an operational test would expose ground support personnel to the toxic exhaust products of hydrazine combustion. It can therefore be appreciated that the gas generator would be required to be rebuilt after virtually every use to insure that loss of the aircraft does not result from decreased performance of the gas generator due to catalyst degradation from oscillatory vibration.

Although failure of the gas generator resulting in possible loss of an aircraft is of paramount importance, another major concern in premature catalyst degradation is the high cost of rebuilding the gas generator and replacing the catalyst. To rebuild the gas generator, it is necessary to remove the generator from the aircraft and completely disassemble it to replace the catalyst. Such an operation is labor intensive, requiring a substantial amount of time from a skilled technician. In addition, the Shell 405 or like catalyst used in the gas generator is extremely expensive. Although only a small amount of catalyst is contained in the bed, the cost of even the small amount of catalyst may be greater than the cost of the mechanically complete generator. Finally, an additional cost in military applications is that the aircraft must either have a large number of spare gas generators on hand, or else be unavailable for service while the gas generator is being rebuilt.

Thus, it can be seen that a strong need exists for a gas generator having an extended catalyst life allowing the generator to be reused a large number of times while requiring only minimal maintenance between uses. The gas generator must protect the catalyst particles from destructive oscillatory vibration. The gas generator must be capable of functioning reliably at low temperatures, and of providing multiple starts at these low temperatures. Finally, it is desirable that whatever solution is found be adaptable to retrofit existing gas generators to overcome the above-described problems.

SUMMARY OF THE INVENTION

Accordingly, it is an object of the present invention to provide an emergency power unit, gas generator apparatus and method which prevents vibration of the catalyst bed while permitting motion of the bed in response to the spring loading thereon, and while also automatically compensating for the permitted motion of the bed.

Another object is to provide such apparatus and method readily reftrofitted into existing emergency power unit designs.

Briefly, the invention contemplates inclusion of a locking means for preventing motion of the bed in a second direction opposing the first direction induced by the spring load, which locking means are automatically extensible in length in response to movement of the bed in the first direction to maintain the locking action thereof. This may be accomplished by inclusion of a pin and a sleeve within the interior of one or more of the coil biasing springs. The pin is biased by the spring to move in the first direction with the bed, thereupon sliding within the interior of the sleeve, and the sleeve is secured by the spring to the stationary housing. A locking element lockingly interengages the interior of the sleeve and a ramped surface on the pin. The locking element is lightly biased into such interengagement and follows the pin in its spring-induced movement in the first direction to continue prevention of return motion in the second direction.

These and other objects and advantages of the present invention are specifically set forth in or will become apparent from the following detailed description of a preferred embodiment of the invention when read in conjunction with the accompanying drawings.

DETAILED DESCRIPTION OF THE PREFERRED EMBODIMENT

Figure 1:
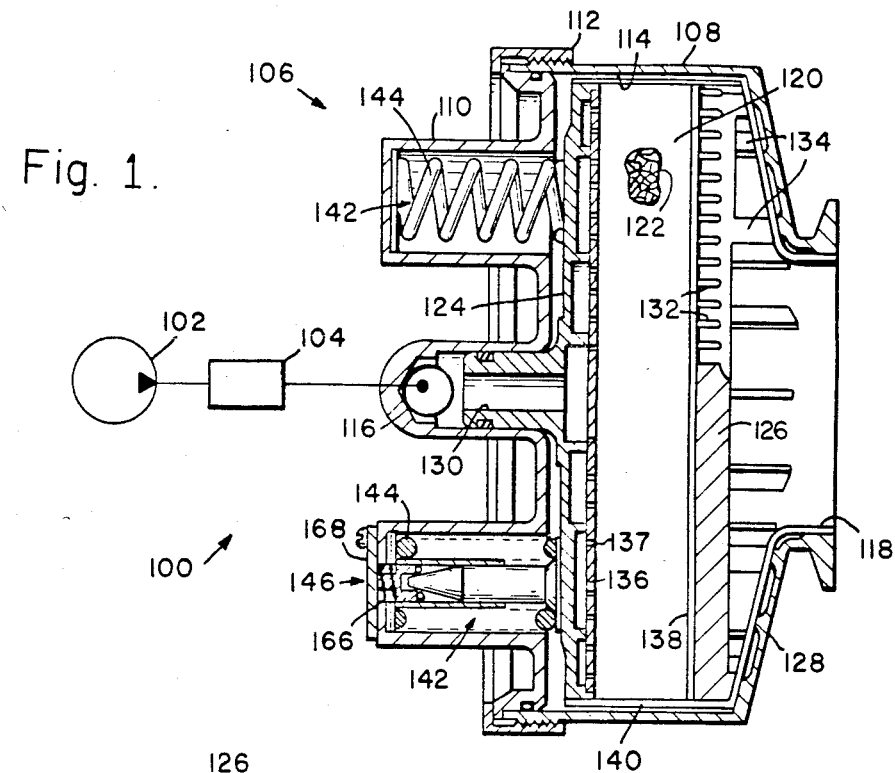
FIG. 1 is a partially schematic, partially cross-sectional elevational view of an emergency power unit embodying the principles of the present invention.

Referring now more particularly to the drawings, an emergency power unit generally designated by the numeral 100 includes a source 102 of pressurized liquid hydrazine, a control including an electrical control unit 104 for developing a pressurized flow of the liquid hydrazine (the control being capable of varying the rate of the liquid flow), and a gas generator generally denoted by the numeral 106. Generator 106 includes a housing comprised of a body 108, an end wall 110, and a nut ring 112 rigidly intersecuring the end wall 110 and body 108 to define a central cavity 114 within the housing. An inlet 116 in the housing communicates to receive the flow of pressurized liquid, and an exhaust 118 carries motive gas discharge flow from the gas generator. Inlet 116 extends through the end wall 110 which presents one transverse end wall of the housing, while outlet 118 extends from central cavity 114 through another transverse end wall 128 as presented by the rightward side of body 108. Thus the liquid inlet flow is delivered from inlet 116 to flow generally axially through cavity 114 toward outlet 118.

Disposed within cavity 114 is a porous bed 120 comprised of granular catalyst material 122. As shown partially in FIG. 1 the catalyst material comprises granules or slivers of catalyst material compacted within a confined space. The bed has sufficient porosity to permit flow of the inlet liquid therethrough without substantial pressure drop thereacross. The catalyst material is operable to chemically react with the liquid hydrazine to generate heat and transform the liquid into a higher energy, hotter motive gas flow which is then discharged through exhaust or outlet 118.

Figure 2:
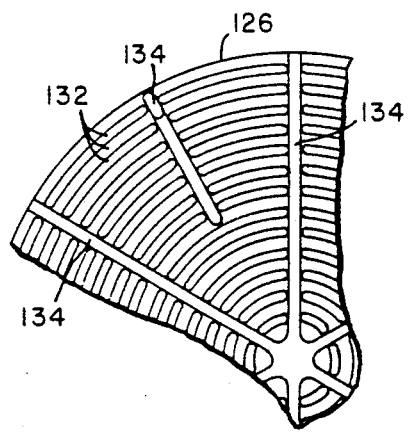
FIG. 2 is a fragmentary transverse cross-sectional view of the support cover.

Bed 120 is surrounded by a container defined by a first transverse container wall comprising a support cover 124 located adjacent end wall 110 of the housing, and a second transvese container wall comprising a support cover 126 disposed between the catalyst bed with support legs 134 extending into supporting engagement with the transverse end wall portion 128 of body 108. Support cover 124 includes a central aperture 130 for carrying of the liquid flow from inlet 116 to cavity 114, while the other support cover 126 has a plurality of circular concentric apertures 132 therein for permitting the motive gas flow from bed 120 to pass to outlet 118. Openings 132 clearly illustrated in FIG. 2 provide a substantial open area in support cover 126. Interposed between support cover 124 and bed 120 is a screen or filter 136 having a plurality of apertures or spray nozzles 137 therein for uniformly distributing the inlet liquid hydrazine flow across the face of bed 120. Preferably filter screen 136 is tack welded upon support cover 124. Similarly, a filter screen 140 is disposed between the opposite side of bed 120 and support cover 126. Completing the container for bed 120 is a thin, axially extending sleeve 140 secured to cover 124 and overlapping the end of support cover 126.

End wall 120 is configured with a plurality of equally spaced cup-like zones 142 disposed circularly about the central axis of aperture 130. Each zone 142 contains a coil biasing spring 144 which extends between the leftward, transverse end of wall 110 and the support cover 124 so as to bias the entire bed and container assembly surrounding the bed 120 generally rightwardly in FIG.

1. This, of course, urges support cover 126 into firm supporting contact with the end wall portion 128 of body 108.

Figure 3:
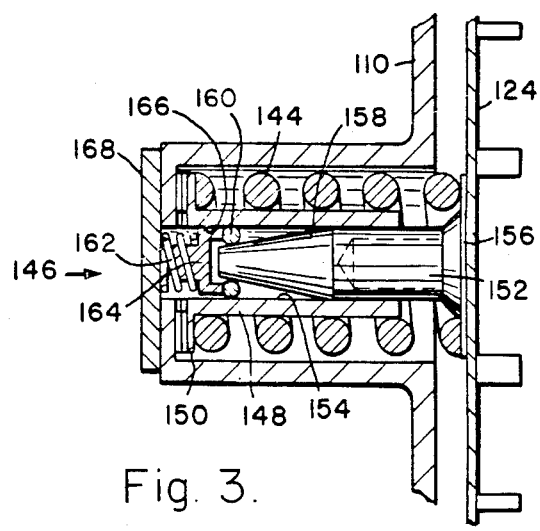
FIG. 3 is an enlarged elevational cross-section view of the locking means of the present invention.

Associated with at least one of the springs 144, and preferably associated with three of springs 144 spaced equidistantly about the central axis of the gas generator, is a locking assembly for preventing leftward movement of the porous bed 120. One such locking assembly 146 is illustrated in FIG. 1 and in greater detail in FIG. 3. Assembly 146 includes a sleeve 148 disposed within the central interior of spring 144, having an end flange portion 150 which is captured between the end wall 110 and coil spring 144. Thus, spring 144 holds sleeve 148 securely to end wall 110. Assembly 146 further includes a pin 152 which is slidably received within an internal through bore 154 of sleeve 148. Pin 152 also includes an end flange section 156 captured between the other end of coil spring 144 and support cover 124. Thus coil spring 144 biases pin 152 rightwardly into engagement with and movement with support cover 124. Pin 152 further includes a tapered end section 158 located within internal bore 154 of sleeve 148.

Locking assembly 146 includes a locking element in the form of a plurality of small steel balls 160 disposed in locking interengagement with tapered surface 158 of pin 152 and the internal bore 154 of sleeve 148. Steel balls 160 are urged rightwardly into such locking interengagement by light biasing spring 162 which acts through a retainer 164. Preferably, end wall 110 may have an appropriate opening 166 covered by an end cap 168 which is releasably secured to end wall 110 to permit access within zone 142, and more particularly to permit final assembly of balls 160, spring 162 and retainer 164 as final step in assemblying the locking means 146.

The light biasing spring 162 needs to exert a minor rightward force to urge balls 160 into locking, frictional interengagement with the slightly tapered surface 158 and the internal ball 154. When so urged rightwardly, the steel balls effectively lock the sleeve 158 to pin 154 to prevent leftward movement of pin 152 relative to sleeve 148. At the same time however, pin 152 may shift rightwardly, following rightward movement of the catalyst bed, since the tapered surface 158 may be withdrawn rightwardly from the steel balls 160. Upon such occurrence, however, the biasing force of spring 162 urges retainer 164 and balls 160 to follow the rightward movement of pin 152 and thus lock the pin into its new, more rightward position upon completion of the described rightward movement. Since the balls 160 follow the travel of pin 152, the pin 152 is still constrained against leftward movement relative to sleeve 148. Thus, it can be seen that the locking assembly 146 is automatically extensible in axial length in response to rightward movement of the catalyst bed 120 and support cover 124 so as to maintain the locking interengagement preventing and inhibiting leftward movement of the catalyst bed.

In operation, the emergency power unit 100 may be utilized in an aircraft to provide emergency power for starting a main engine or other necessary power in the event of an emergency. The unit 100 is energized by appropriate command controls to unit 104 to develop a flow of pressurized liquid hydrazine into inlet 116 to be distributed across and flow axially through bed 120. The liquid hydrazine chemically reacts with the catalyst bed to generate a hot motive gas flow which is exhausted through outlet 118 to be delivered to an appropriate fluid motor for developing rotary mechanical power. It has been found that the liquid flow passing axially through the porous bed sets up axial vibration of the granular catalyst material therewithin. As described, such axial vibration has been found to dramatically limit the effective life of catalyst material by tending to grind the pellets of catalyst material into a fine powder.

The action of locking assembly 146, however, prevents the tendency of the porous bed of catalyst material to vibrate axially to dramatically increase the life thereof. More particularly, as axial motion of the catalyst bed occurs rightwardly, the steel balls 160 follow rightward movement as described previously to maintain the locking interengagement between tapered surface 158 and internal bore 154. Because of the locking interengagement, leftward movement of the bed of porous granular catalyst material is effectively prohibited. As a result, vibration in an axial direction of the porous bed is effectively eliminated.

The emergency power unit is, obviously, used only for a short period of time and only in emergency situations. After exhaust of the source of liquid hydrazine through one use of the unit, it is conventionally required to resupply the liquid hydrazine in ground operation prior to reuse of the emergency power unit. Also, during a single use of the emergency power unit, some compaction of the porous bed of granular catalyst material 120 normally occurs. Since this effectively reduces the axial width of the porous bed, the springs 142 are included to automatically compensate for the reduced axial width to permit reuse of the catalyst material. However, as noted previously the inclusion of the springs and their biasing force tend to enhance the axial vibration of bed 120. With the inclusion of locking assembly 146 afforded by the present invention such axial vibration and any enhancement thereof is effectively precluded. The locking assembly 146 operates automatically in response to any reduction in axial width of the porous bed due to compaction thereof so as to extend automatically rightwardly so that no internal adjustment of the device is required after an initial use to maintain the locking action thereof. Thus, it will be seen that the emergency power unit 100 may be repeatedly used without any servicing of the interior thereof.

It has been found that by virtue of the automatic extension of the locking assembly 146, sufficient liquid hydrazine may be maintained as a source to permit more than one use of the emergency power unit in a single aircraft operation. This permits for example, an emergency power start on the ground of the main engines of the aircraft, and a second, subsequent in-flight emergency engine start. Many of these cycles may be performed without requiring that the catalyst bed be serviced.

From the foregoing it will be apparent that the present invention comtemplates an improved method of generating an emergency motive gas flow which includes the production of a pressurized, liquid feed flow that reacts with catalyst bed 120 to generate the emergency flow of motive gas. The container holding the catalyst bed is spring loaded in the direction of flow toward a fixed support in the form of wall 128, and vibration of the bed is inhibited by securing the container against motion in the opposite direction without impairing the spring loading. Movement of the container in the direction of flow is automatically compensated for, such that the container and bed still cannot move in the opposite direction.

It will be clear that the present invention may be readily retrofitted into existing emergency power unit design. At the appropriate zones 142, the opening 166 is drilled through wall 110 and cover 168 secured thereacross. Additionally, upon assembly the locking means 146 are installed i.e., the sleeve 148, pin 152, balls 160, spring 162, and retainer 164. The locking means fit within the existing space so that no further modification is required.

Various modifications to the foregoing description of the preferred embodiment of the invention will be apparent to those skilled in the art. Accordingly, the foregoing should be considered exemplary in nature and not as limiting to the scope and spirit of the invention as set forth in the appended claims.

Having described the invention with sufficient clarity that those skilled in the art may make and use it, what is claimed is:

1. A gas generator comprising:
a housing having an inlet adapted to receive pressurized liquid fluid flow and an outlet for discharging a motive gas flow;
a porous bed of granular catalyst material disposed within said housing for reacting with the liquid fluid flow to generate the motive gas flow;
wall means in said housing for containing said bed within a confined space;
biasing means operably engaging said wall means for exerting a biasing force in one direction tending to compact said bed of granular material; and
locking means operably engaging said wall means for preventing movement of said bed in a second direction opposite said first direction, said locking means being automatically extensible in length in response to movement of said wall means in said one direction to follow the latter and remain in locking engagement therewith to prevent movement of said bed in said second direction.

2. In a gas generator having a porous bed of granular catalyst material adapted to react with a pressurized, liquid flow to generate a higher energy motive gas exhaust flow, said liquid flow tending to induce vibration of said porous bed: porous wall means for holding said porous bed within a confined space; biasing means for exerting a force tending to compact said granular material of the porous bed; and locking means operably engaging said wall means for preventing movement of said bed in a direction opposing said force to inhibit said vibration of the porous bed, said locking means being automatically extensible in length in response to movement of said wall means created by said force of the biasing means to automatically follow said wall means and remain in locking engagement therewith to prevent movement of said bed in said opposing direction.

3. In an emergency power unit having a pressurized fluid feed flow, a gas generator for producing a motive gas discharge flow, comprising:
a housing having an internal cavity bounded by axially spaced, transverse walls, an inlet for receiving said feed flow, and an outlet for said gas discharge flow, said inlet and outlet opening into said cavity;
a porous bed of granular catalyst material disposed in said cavity and operable to chemically react with said feed flow passing axially therethrough to generate said gas discharge flow;
transverse, rigid, container walls for containing said granular catalyst material;
a plurality of biasing springs operably extending between one of said walls of the housing and one of said container walls for exerting a biasing force tending to compact said granular material and for urging the other of said container walls axially into operably supporting contact with the other of said walls of the housing; and
means secured to said housing and contacting said one container wall for holding the latter from moving axially relative to said housing in a direction increasing the axial width of said confined space, without impairing the action of said biasing force of the springs in urging said bed to move axially toward said other wall of the housing to reduce said axial width, said means being automatically extensible in length in response to movement of said bed toward said other wall of the housing to remain in holding contact with said one container wall to continue prevention of movement of said one container wall in said direction increasing the axial width.

4. A method of generating a controlled, emergency flow of motive gas, comprising:
producing a pressurized, liquid feed flow;
reacting said feed flow with a confined bed of granular catalyst material to generate said emergency flow of motive gas, said feed flow tending to induce vibration of said bed of granular material; and
spring loading a container holding the bed in a confined space in one direction toward a fixed support, the spring loading tending to enhance vibration of said bed;
inhibiting vibration of said bed induced by said feed flow by securing said container against motion in a direction opposing said one direction without impairing said spring loading in said one direction; and
automatically compensating for movement of said container in said one direction to continue prevention of motion of said container in said opposing direction.

5. An emergency power unit, comprising:
a source of pressurized liquid;
a control for developing a pressurized flow of said liquid;
a housing having an internal cavity bounded by first and second, axially spaced transverse walls, said housing having an inlet for receiving said pressurized flow extending through said first wall to said cavity, and an outlet extending from said cavity through said second wall for carrying a motive gas discharge flow;
a porous bed of granular catalyst material in said cavity for reacting with said pressured flow passing axially therethrough to generate said motive gas discharge flow, said pressurized flow tending to impart axial vibration to said bed;
transverse, rigid filter screens on opposing sides of said bed;
first and second, porous, rigid support plates disposed between said filter screens and said first and second transverse walls respectively;
a plurality of coil springs extending from said first transverse wall to said first support plate for urging said bed axially in the direction of said flow therethrough to urge said second support plate into supporting contact with said second transvese wall; and
locking means disposed centrally within at least one of said coil springs and extending between said first transverse wall and said support cover for preventing axial movement of said bed and said first support cover toward said first transverse wall in a direction opposing said direction of flow.

6. An emergency power unit as set forth in claim 5, wherein said locking means comprise a pin extending axially within the center of said one of the coil springs with a flange at one end of said pin disposed between said one of the coil springs and said first support cover, and a tapered surface at an opposite end of said pin; a sleeve concentrically surrounding said opposite end of the pin with a flange disposed between said first transverse wall and said one of the coil springs; and an element in locking engagement with the interior surface of said sleeve and said tapered surface of said pin.

7. An emergency power unit as set forth in claim 6, wherein said locking means further comprises a biasing spring extending between said first transverse wall and said locking element for urging the latter axially in said direction of flow into said locking engagement.

8. An emergency power unit as set forth in claim 7, wherein said element comprises a plurality of balls disposed around said tapered surface in wedged, locked contact with said internal surface of the sleeve.

9. An emergency power unit as set forth in claim 8, wherein said locking means further includes a retainer disposed between said plurality of balls and said biasing spring, said biasing spring urging said balls to follow said pin and remain in said locking engagement upon axial movement of said bed and said first support cover in said direction of flow.

10. An emergency power unit as set forth in claim 9, wherein said locking means are automatically extensible in length upon movement of said bed in said direction of flow to remain in contact with said first support wall to continue prevention of movement of said bed in said opposing direction.

11. An emergency power unit as set forth in claim 10, wherein said locking means include a sleeve disposed within said one coil spring and biased thereby into engagement with said first transverse wall, said sleeve having an internal through bore; a pin slidably received within said internal bore and biased by said one coil spring into engagement with and movement with said first support cover, said pin having a tapered surface located within said internal bore, and a locking element disposed in locking frictional engagement with said internal bore and said tapered surface.

12. An emergency power unit as set forth in claim 11, wherein said locking means further comprises a biasing spring extending between said first transverse wall and said locking element for urging the latter axially in said direction of flow into said locking engagement.

13. An emergency power unit as set forth in claim 12, wherein said element comprises a plurality of balls disposed around said tapered surface in wedged, locked contact with said internal bore of the sleeve.

14. An emergency power unit as set forth in claim 13, wherein said locking means further includes a retainer disposed between said plurality of balls and said biasing spring, said biasing spring urging said balls to follow said pin and remain in said locking engagement upon axial movement of said bed and said first support cover in said direction of flow.

* * * * *